Oct. 1, 1968          R. L. QUAINE          3,403,937

SUN VISOR CONSTRUCTION

Filed July 19, 1966

Robert L. Quaine
*INVENTOR.*

BY *Clarence A. O'Brien and Harvey B. Jackson*
                            *Attorneys*

United States Patent Office 3,403,937
Patented Oct. 1, 1968

3,403,937
SUN VISOR CONSTRUCTION
Robert L. Quaine, 924 Merchant St., P.O. Box 557,
Port Huron, Mich. 48060
Filed July 19, 1966, Ser. No. 566,417
8 Claims. (Cl. 296—97)

ABSTRACT OF THE DISCLOSURE

An elongated track member including generally straight angularly disposed adjacent sections curving smoothly into each other at adjacent ends and extending along the upper marginal portions of the windshield and side window portions of a vehicle with a sun visor member having follower members secured to its opposite ends slidingly engaged in the guide or track member for movement therealong and with the follower members being oscillatable relative to the sun visor member about an axis extending between the follower members, the follower members also being oscillatable relative to the guide or track member about upstanding axes.

---

This invention relates to a novel and useful sun visor construction and more specifically to a sun visor construction adapted primarily for use on motor vehicles.

Although the sun visor construction of the instant invention is illustrated and described herein as being used in conjunction with a motor vehicle, it is to be understood that the visor construction could also be readily utilized in other vehicles such as boats, airplanes and trains.

The sunvisor construction of the instant invention is adapted to be utilized in a vehicle adjacent two angularly disposed window assemblies such as one side portion of a windshield assembly and an adjacent side window. In addition, the sun visor construction of the instant invention may be utilized in conjunction with an entire windshield assembly and the two adjacent side windows disposed on opposite sides of the windshield assembly.

The sun visor construction includes an elongated guide member including at least first and second generally straight angularly disposed sections which are disposed generally in the same plane and are connected at adjacent ends by means of an integral intermediate curved section whose opposite ends smoothly curve into the adjacent ends of the straight sections. The guide member is adapted to be secured within a motor vehicle from the top thereof with one straight section extending across at least one end of the windshield assembly of the vehicle and the other straight section extending along the upper edge of the adjacent side window construction. A pair of follower members are guidingly engaged with the guide member at points spaced longitudinally therealong for reciprocal movement along the guide member and a panel-like sun visor including one edge portion generally paralleling the plane in which the elongated guide member is disposed has the follower members engaged with the guide member supported therefrom. By this construction, the single panel-like sun visor may be moved from a position dependingly supported from one of the straight sections of the guide member to a position dependingly supported from the other straight section of the guide member merely by sliding the sun visor toward the other straight section causing the follower members to successively traverse the integral intermediate curved section of the guide member. In addition, the panel-like sun visor is pivotally supported from the follower members in a manner enabling the sun visor to swing about an axis extending between the follower members independent of their positions longitudinally of the guide member.

The main object of this invention is to provide an improved sun visor construction for vehicles including adjacent angularly disposed window assemblies.

Another object of this invention, in accordance with the immediately preceding object, is to provide a sun visor construction which may be slid generally longitudinally from a position dependingly supported from the upper marginal edge portion of one window assembly to a position dependingly supported from the upper marginal edge portion of a second window assembly angularly disposed relative to the first mentioned window assembly. By this construction, the necessity of swinging a sun visor about a pivotal axis between a position depending from one side of a motor vehicle windshield assembly to a position dependingly supported from the adjacent side window of the vehicle is eliminated.

Yet another object of this invention is to provide an improved sun visor construction for motor vehicles including means by which a single sun visor element may be readily shifted transversely of the associated windshield from a position disposed at one side of the windshield assembly to a position disposed at the other side of the windshield assembly.

A final object of this invention to be specifically enumerated herein is to provide a sun visor construction which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
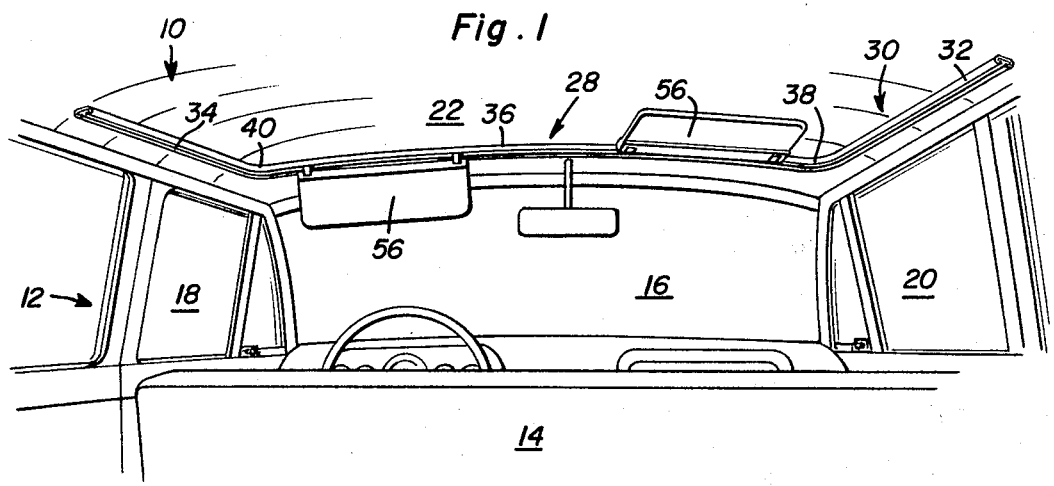
FIGURE 1 is a fragmentary interior perspective view of the front of a motor vehicle passenger compartment as seen from the rear of the compartment and illustrating the sun visor construction of the instant invention operatively supported within the passenger compartments.

Referring now more specifically to the drawings, the numeral 10 generally designates a convetnional form of motor vehicle including a body referred to in general by the reference numeral 12 defining a passenger compartment 14. The passenger compartment 14 includes a windshield assembly 16, a pair of front opposite side window assemblies 18 and 20, and a roof or top structure 22.

The roof or top structure 22 includes reinforcing members 24 and a head liner assembly 26 underlying the reinforcing members 24.

The sun visor construction of the instant invention is generally designated by the reference numeral 28 and includes an elongated guide member referred to in general by the reference numeral 30. The guide member 30 includes a pair of opposite end straight sections 32 and 34, a central generally straight but slightly arcuate section 36, and a pair of curved sections 38 and 40 which join the forward ends of the sections 32 and 34, respectively, with the corresponding opposite ends of the center section 36. The guide member 30 is in the form of a channel member including a pair of opposing flanges 42 and 44, which are generally semi-circular in cross-section, interconnected along one pair of corresponding longitudinal edge portions by means of a laterally offset bight portion 46. The bight portion 46 is suitably apertured as at 48 at points spaced longitudinally therealong and a plurality of fasteners 50 are secured through the apertures 48 and to the bracing members 24. The channel or guide member 30 defines a generally T-shaped groove in which the circular disc shaped head portions 52 of a pair of follower members 54 for each sun visor member 56 are slidingly disposed. The head portions 52 are freely slidable along the guide member 30 within the T-shaped slot defined thereby and inasmuch as the head portions 52 are circular, they may readily navigate the curved sections 38 and 40 of the guide member 30.

Each of the follower members 54 defines an arm portion 57 which projects downwardly from the head portion 52 thereof and which is provided with a suitable bore 58. A pair of suitable fasteners 60 are utilized to pivotally secure each of the arms or arm portions 57 in a notch 62 provided therefor in a corresponding edge of the associated sun visor 56.

Figure 2:
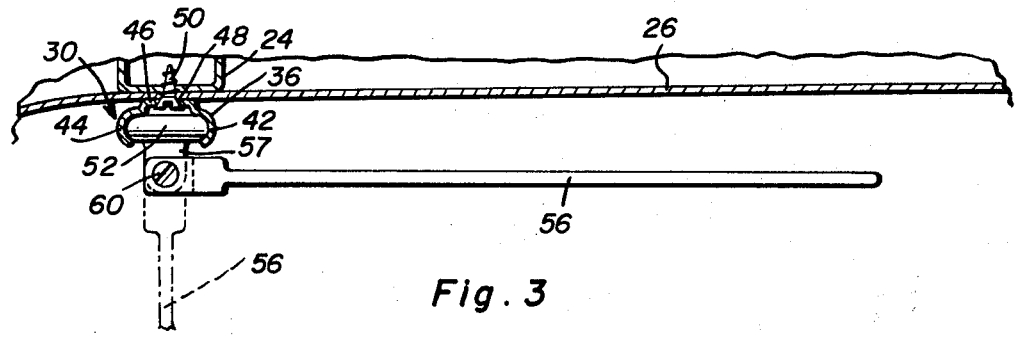
FIGURE 2 is an enlarged fragmentary longitudinal vertical sectional view taken substantially upon a plane passing between the two sun visors illustrated in FIGURE 1.
Figure 3:
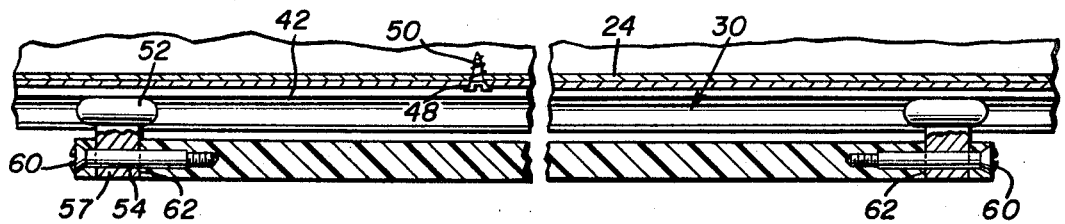
FIGURE 3 is an enlarged fragmentary horizontal sectional view taken substantially upon a plane passing through the pivot axis of one of the sun visors.
Figure 4:
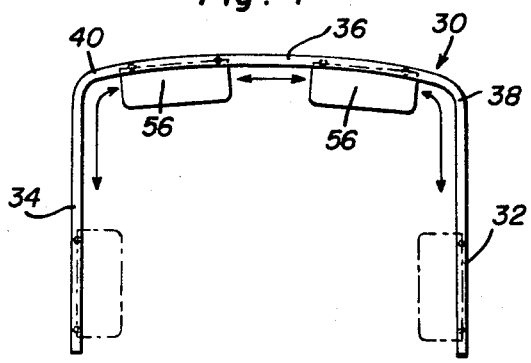
FIGURE 4 is a diagrammatical top plan view of the sun visor construction illustrated in FIGURE 1 on somewhat of a reduced scale.
Figure 5:
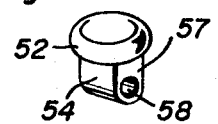
FIGURE 5 is an enlarged perspective view of one of the follower members of the sun visor construction.

The fasteners 60 are secured in the sun visors 56 in a manner such that the arms 57 are freely supported from the fasteners 60 for pivotal movement relative thereto and accordingly, it may be seen that each of the sun visors 56 may be pivoted from the solid line position thereof illustrated in FIGURE 2 of the drawings to the phantom line position thereof illustrated in FIGURE 2.

Although the sun visor construction could include a pair of generally L-shaped guide members spaced slightly apart at the center of the windshield assembly 16, a single U-shaped guide member is useful in that the right hand sun visor 56 in FIGURE 1 may be shifted so as to depend from the section 32 and the left hand sun visor 56 in FIGURE 1 may be shifted to the position previously occupied by the right hand sun visor 56. Still further, the rear ends of the sections 32 and 34 may be extended further rearwardly so as to enable either of the sun visors 56 to also be dependingly supported from one of the rear side windows of the vehicle 10. Further, if it is desired, the guide member 30 could have one or more adidtional sun visors corresponding to the sun visors 56 supported therefrom in order that each front and side window of the vehicle 10 could have a sun visor operatively associated therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sun visor construction comprising an elongated and generally horizontal guide member including first and second generally straight angularly disposed sections connected at adjacent ends by means of an intermediate curved section whose opposite ends smoothly curve toward said adjacent ends, a pair of follower members guidingly engaged with said guide member at points spaced longitudinally therealong for reciprocal movement along said guide member and rotatable relative to said guide member about generally parallel upstanding axes, and a substantially nonbendable sun visor panel including one generally horizontal edge portion, said follower members being supported from said one edge portion for pivotal movement of said visor relative thereto about an axis extending between said follower members.

2. The combination of claim 1 wherein said edge portion of said visor extends between opposite end edge portions of said visor, said follower members being supported from said visor for pivotal movement relative thereto by means of elongated pivot shank portions from which said follower members are supported and which are endwise secured in the end edge portions of said visor and generally parallel said one edge portion.

3. The combination of claim 1 wherein said guide member defines a groove extending longitudinally thereof opening toward said visor, said groove being generally T-shaped in cross-sectional shape and said follower members including head portions complementary in cross-sectional shape to and captively disposed in said groove.

4. The combination of claim 1 wherein said guide member defines a groove extending longitudinally thereof opening outwardly of one side of said plane, said groove being generally T-shaped in cross-sectional shape and said follower members including head portions complementary in cross-sectional shape to and captively disposed in said groove, said head portions being circular in plan shape and rotatable in said groove.

5. In combination with a vehicle including first and second adjacent window portions extending transversely and longitudinally of said vehicle, a sun visor construction comprising an elongated generally horizontal guide member including at least first and second generally straight angularly disposed sections connected at adjacent ends by means of an intermediate curved section whose opposite ends smoothly curve toward said adjacent ends, said guide members being supported in said vehicle with said first and second sections extending along the upper edge portions of said first and second windows, respectively, a pair of follower members guidingly engaged with said guide member at points spaced longitudinally therealong for reciprocal movement along said guide member and rotatable relative to said guide member about generally parallel upstanding axes, and a substantially nonbendable sun visor panel including one generally horizontal edge portion, said follower members being supported from said one edge portion for pivotal movement of said visor relative thereto about an axis extending between said follower members.

6. The combination of claim 5 wherein said guide member defines a groove extending longitudinally thereof opening toward said visor, said groove being generally T-shaped in cross-sectional shape and said follower members including head portions complementary in cross-sectional shape to and captively disposed in said groove.

7. The combination of claim 5 wherein said vehicle includes a top and said guide member is supported within said vehicle from said top.

8. The combination of claim 5 wherein said vehicle includes a third window portion angularly disposed relative to and adjacent said second window portion on the side thereof remote from said first window portion, said guide member including a third generally straight portion extending along the upper edge portion of said third window portion and connected to the end of said second straight section remote from said first straight section by means of a second curved section.

References Cited
UNITED STATES PATENTS

| | | | |
|---|---|---|---|
| 947,019 | 1/1910 | Monnier | 49—409 X |
| 2,230,615 | 2/1941 | Dick | 49—409 X |
| 2,932,539 | 4/1960 | Galbraith. | |
| 2,978,274 | 4/1961 | Ordman. | |
| 3,029,103 | 4/1962 | Horrocks. | |
| 3,122,393 | 2/1964 | Moody. | |

BENJAMIN HERSH, *Primary Examiner.*

J. A. PEKAR, *Assistant Examiner.*